United States Patent Office 2,935,521
Patented May 3, 1960

2,935,521

6β-HYDROXYCORTISONE 6,21-DIACYLATE COMPOUNDS AND PROCESS FOR THE PRODUCTION THEREOF

Arthur R. Hanze, Kalamazoo Township, Kalamazoo County, Herbert C. Murray, Barry Township, Barry County, and Oldrich K. Sebek, Kalamazoo, Mich., assignors to The Upjohn Company, Kalamazoo, Mich., a corporation of Michigan No Drawing. Application November 21, 1958
Serial No. 775,358

5 Claims. (Cl. 260—397.45)

The present invention relates to a new process for the production of 6β-hydroxycortisone 6,21-diacylates and to the novel intermediates, 6β,21-dihydroxy-4,17(20)-pregnadiene-3,11-dione and the 6,21-diacylates thereof.

It is an object of the present invention to provide a process for the production of 6β-hydroxycortisone 6,21-diacylate. Another object is to produce the novel intermediate, 6β,21-dihydroxy-4,17(20) - pregnadiene - 3,11-dione and the 6,21-diacylates thereof. Other objects will be apparent to those skilled in the art to which this invention pertains.

The process of the present invention comprises: aerobically contacting 11β,21-dihydroxy - 4,17(20) - pregnadien-3-one with the oxidizing activity of a species of the fungus Rhizopus in an equeous nutrient medium under agitated, submerged, aerobic fermentation conditions until a substantial amount of 6β,21-dihydroxy-4,17(20)-pregnadiene-3,11-dione is produced. The 6β,21-dihydroxy-4,17(20)-pregnadiene-3,11-dione is then esterified with an acylating agent, where the acyl radical is of an organic acid, preferably a hydrocarbon carboxylic acid containing from one to twelve carbon atoms, inclusive, to produce 6β,21-dihydroxy-4,17(20)-pregnadiene-3,11-dione 6,21-diacylate. The 6β,21-dihydroxy-4,17(20)-pregnadiene-3,11-dione 6,21-diacylate is thereupon treated with osmium tetroxide in the presence of a peroxide, such as hydrogen peroxide or an amine oxide peroxide, such as n-methylmorpholine oxide peroxide to give 6β-hydroxycortisone 6,21-diacylate.

The 6β-hydroxycortisone 6,21-diacylates have antiphlogistic, anti-rheumatoid, anti-arthritic and anti-inflammatory activity. They are useful in the treatment of inflammatory conditions of the skin, nose, eyes and ears of humans and domestic animals which are caused by a variety of bacterial and fungal infections, contact dermatitis and other allergenic reactions. These compounds also have diuretic activity and salt losing properties which make then useful in the alleviation of edematous conditions resulting from excessive retention of salt and water.

In general, the compounds of the present invention can be prepared for animal or human use by incorporating them in any one of several dosage forms suitable for such use. Such dosage forms include the active ingredients plus a non-toxic carrier which can be either a solid material or a liquid. Bland carriers are preferred for oral use, and examples of oral dosage forms are tablets, capsules, liquid suspensions or solutions. For the dosage forms which are particularly suitable for parenteral administration, a sterile diluent is necessary. When the active ingredients are to be used topically they can be incorporated in an ointment, a bougie, a lotion or a jelly. When the intended use is the eye or ear, the compounds can be prepared in the form of drops or an ointment. The compounds may also be prepared in an aerosol vehicle when the intended use is nasal.

According to the process of the present invention, the starting material, 11β,21-dihydroxy-4,17(20)-pregnadien-3-one, is converted to 6β,21-dihydroxy-4,17(20)-pregnadiene-3,11-dione by incorporating the 11-hydroxy starting material in the fermentation medium with the oxidizing activity of a species of fungus of the genus Rhizopus. Throughout the genus the proportion of 6β,21-dihydroxy-4,17(20)-pregnadiene-3,11-dione product will vary compared with other oxidized and/or hydroxylated substances present. Recovery of the above-named product from the fermentation liquors, can be accomplished by the methods described in the examples which follow. Species in which the proportion of the above-named product is especially high are *Rhizopus arrhizus, Rhizopus delemar, Rhizopus oryzae, Rhizopus japonicus, Rhizopus shanghaiesis,, Rhizopus kazensis, Rhizopus kohnii, Rhizopus tritici,* and *Rhizopus nigricans.* Typical strains of these organisms are listed below.

*Rhizopus arrhizus* A.T.C.C. 11145 (Rh-176)
*Rhizopus arrhizus* NRRL (R-16)
*Rhizopus delemar* A.T.C.C. 4858
*Rhizopus delemar* A.T.C.C. 9374
*Rhizopus oryzae* A.T.C.C. 9363
*Rhizopus oryzae* A.T.C.C. 10260
*Rhizopus nigricans* A.T.C.C. 10404
*Rhizopus nigricans* A.T.C.C. 7577
*Rhizopus nigricans* A.T.C.C. 6204
*Rhizopus japonicus* A.T.C.C. 8466
*Rhizopus shanghaiesis* A.T.C.C. 10329
*Rhizopus kazensis* A.T.C.C. 8998
*Rhizopus kohnii* A.T.C.C. 8996
*Rhizopus tritici* A.T.C.C. 1230

The process of the invention is carried out by contacting the steroid starting material, above mentioned, with the oxidizing activity of a species of fungus of the genus Rhizopus in an aqueous nutrient medium under agitated, submerged, aerobic fermentation conditions as disclosed in U.S. Patent 2,602,769. This is preferably accomplished by direct fermentation with the microorganism, but can readily be accomplished by using the oxidizing enzymes thereof as disclosed in the patent.

The 6β,21 - dihydroxy-4,17(20)-pregnadiene-3,11-dione is recovered from the fermentation reaction mixture and purified by conventional methods, such as for example, extraction with an organic solvent and recrystallization as disclosed in the cited patent. The preferred method is the extraction procedure wtih methylene chloride as disclosed by D. H. Peterson et al., J. Am. Chem. Soc., 74, 5933 (1952). The crude solvent-free residue thus obtained can be purified to yield 6β,21-dihydroxy-4,17 (20)- pregnadiene-3,11-dione by chromatography or recrystallization from an organic solvent such as acetone, ethylene chloride, chloroform, ethers, esters, ketones, ethyl acetate, amyl acetate and the like.

The esterification step involves the conversion of 6β,21-dihydroxy-4,17(20)-pregnadiene-3,11-dione to the corresponding 6,21-diacyloxy compound. This reaction can be performed under esterification conditions known in the art, e.g., by the reaction of the 6,21-dihydroxy steroid with the selected acid halide, e.g., acid chloride or acid bromide, or the anhydride of an organic carboxylic acid. Compounds thus produced include the 6β,21-dihydroxy-4,17(20)-pregnadiene-3,11-dione 6,21-diacylates wherein the acyl radical is of an organic acid, preferably a hydrocarbon carboxylic acid containing from one to twelve carbon atoms, inclusive, e.g., propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e.g., cyclopropylideneacetic, cyclopentylformic, cyclopentylacetic, β-cyclohexylpropionic, cyclohexylformic, cyclohexylacetic, an aryl or alkaryl acid, e.g., benzoic, 2-, 3- or 4-methylbenzoic, 2,3-, 2,4-, 2,5-, 2,6-, 3,4- and 3,5-dimethylbenzoic, ethylbenzoic, 2,4,6 - trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, an unsaturated acid, e.g., acrylic, maleic, vinyl acetic, propiolic, undecolic, etc.

The oxidative hydroxylation of 6β,21-dihydroxy-4,17-(20)-pregnadiene-3,11-dione 6,21-diacylate to produce the corresponding 6β-hydroxycortisone 6,21-diacylate is carried out by reaction with osmium tetroxide and an oxidizing agent such as hydrogen peroxide, peracids, alkyl peroxides, amine oxide peroxides, and the like. A preferred procedure involves reaction of 6β,21-dihydroxy-4,17(20)-pregnadiene-3,11-dione 6,21-diacylate with osmium tetroxide and an oxidizing agent, such as an aryl iodoso compound such as phenyl iodoso acetate or a tertiary amine oxide peroxide such as N-methylmorpholine oxide peroxide, in an organic solvent. Tertiary butyl alcohol is the preferred solvent, but other solvents such as methanol, ethanol, acetone, dioxane, and the like are operative. The reaction can be conducted either in the light or in the dark and usually at room temperature, although temperatures from ten degrees centigrade to the boiling point of the mixture are operative. The time required for the reaction is not critical and can be varied between about one and 72 hours, the length of time being dependent on the temperature and the amount of osmium tetroxide and oxidizing agent employed.

The following examples are illustrative of the process and products of the present invention, but are not to be construed as limiting.

EXAMPLE 1

*6β,21-dihydroxy-4,17(20)-pregnadiene-3,11-dione*

A fermenter containing ten liters of a sterile medium at pH 4.9, consisting of ten grams per liter of commercial dextrose and twenty grams per liter of corn steep, was inoculated with 500 milliliters of vegetative growth of *Rhizopus arrhizus* (A.T.C.C. 11145). After 21 hours of vigorous agitation (300 r.p.m.) and aeration at two liters per minute, a solution of 2.5 grams of 11β,21-dihydroxy-4,17(20)-pregnadien-3-one in sixty milliliters of acetone was added, and the fermentation continued for 48 hours under the same conditions. The conversion products were then extracted with methylene chloride and processed in the same manner as described by D. H. Peterson et al., J. Am. Chem. Soc., 74, 5933 (1952), giving about five grams of a crystalline residue. Paper chromatography using the PTF system [A. Zaffaroni et al., J. Biol. Chem., 193, 749 (1951)], indicated the presence of a new compound with greatly increased polarity. The residue was triturated with acetone and filtered, giving 610 milligrams of crystals of crude 6β,21-dihydroxy-4,17-(20)-pregnadiene-3,11-dione. The crude product thus obtained was dissolved in 65 milliliters of hot acetone, filtered through a bed of magnesium silicate filter aid, concentrated to crystallization, filtered and dried, yielding 360 milligrams of 6β,21-dihydroxy-4,17(20)-pregnadiene-3,11-dione melting at 252 to 254 degrees centigrade, having an ultraviolet absorption $$\lambda_{max.}^{alc.} \ 233 \ m\mu$$

$a_M$ 16,000 and infrared maxima in mineral oil mull of 3500, 3410, 1697, 1667, and 1617 reciprocal centimeters.

*Analysis.*—Calculated for $C_{21}H_{28}O_4$ (344.43): C, 73.22; H, 8.20. Found: C, 73.53; H, 8.47.

The mother liquors from the above crystallizations were combined, concentrated to remove the acetone and chromatographed on 300 grams of synthetic magnesium silicate and eluted with 200-milliliter fractions as follows:

TABLE I

| Fractions | Solvents |
| --- | --- |
| 1 to 5 | methylene chloride. |
| 6 to 10 | 12 percent acetone in Skellysolve B hexanes. |
| 11 to 15 | 20 percent acetone in Skellysolve B hexanes. |
| 16 to 23 | 30 percent acetone in Skellysolve B hexanes. |
| 24 to 27 | 50 percent acetone in Skellysolve B hexanes. |

Fractions 17 to 21, inclusive, were combined and crystallized from acetone to give 500 milligrams of 6β,21-dihydroxy - 4,17(20) - pregnadiene - 3,11 - dione melting at 243 to 247 degrees centigrade, which on recrystallization from acetone gave 400 milligrams of 6β,21-dihydroxy-4,17(20)-pregnadiene-3,11-dione melting at 246 to 253 degrees centigrade.

Following exactly the procedure described in the paragraphs above, but substituting *Rhizopus arrhizus* NRRL strain (R–16), *Rhizopus delemar* A.T.C.C. 4858, *Rhizopus oryzae* A.T.C.C. 9363, *Rhizopus nigricans* A.T.C.C. 10404, *Rhizopus japonicus* A.T.C.C. 8466, *Rhizopus shanghaiesis* A.T.C.C. 10329, *Rhizopus kazensis* A.T.C.C. 8998, *Rhizopus kohnii*, A.T.C.C. 8996 and *Rhizopus tritici* A.T.C.C. 1230 in successive experiments for *Rhizopus arrhizus* A.T.C.C. 11145 of Example 1, there was obtained 6β,21-dihydroxy-4,17(20)-pregnadiene-3,11-dione. The fermentation was carried out for a duration of 48 hours, the conversion products extracted with methylene chloride and the crude product recovered as disclosed above. Purification of the crude product can be carried out also exactly as disclosed above, i.e., by chromatography on synthetic magnesium silicate followed by elution with 200-milliliter fractions of methylene chloride followed by fractions of Skellysolve B hexanes containing increasing proportions of acetone within the range of about ten to about fifty percent acetone.

EXAMPLE 2

*6β,21-dihydroxy-4,17(20)-pregnadiene-3,11-dione 6,21-diacetate*

A solution of 400 milligrams of 6β,21-dihydroxy-4,17(20)-pregnadiene-3,11-dione in one milliliter of pyridine and one milliliter of acetic anhydride was allowed to react overnight at about 25 degrees centigrade. The excess acetic anhydride was then decomposed by the addition of ice water and the resulting crystalline solids were removed by filtration and dried, yielding 440 milligrams of crude 6β,21-dihydroxy-4,17(20)-pregnadiene-3,11-dione 6,21-diacetate, melting at 129 to 135 degrees centigrade. Recrystallization from a solution of one milliliter of ethyl acetate and two milliliters of Skellysolve B hexanes gave 270 milligrams of 6β,21-dihydroxy-4,17(20)-pregnadiene-3,11-dione 6,21-diacetate having a melting point of 136 to 138.5 degrees centigrade, a specific rotation of $[\alpha]_D$ plus 66 degrees in dioxane, an ultraviolet absorption $$\lambda_{max.}^{alc.} \ 231 \ m\mu$$

$a_M$ 13,250, and infrared maxima in mineral oil mull of 1732, 1700, 1676, 1617, 1230 and 1250 reciprocal centimeters.

*Analysis.*—Calculated for $C_{25}H_{32}O_6$: C, 70.07; H, 7.53. Found: C, 69.70; H, 7.90.

Similarly, by allowing 6β,21-dihydroxy-4,17(20)-pregnadiene-3,11-dione to react with the appropriate carboxylic acid anhydride, there are produced other 6β,21-diacylates, such as for example, 6β,21-dihydroxy-4, 17(20)-pregnadiene-3,11-dione 6,21-dipropionate, 6β,21-dihydroxy-4,17(20)-pregnadiene-3,11-dione 6,21-dibutyrate, 6β,21 - dihydroxy-4,17(20)-pregnadiene-3,11-dione 6,21-divalerate, 6β,21-dihydroxy - 4,17(20)-pregnadiene-3,11-dione 6,21-dihexanoate, 6β,21-dihydroxy-4,17(20)-pregnadiene-3,11-dione 6,21-dilaurate, 6β,21-dihydroxy-4,17(20)-pregnadiene-3,11-dione 6,21-ditrimethylacetate, 6β,21-dihydroxy-4,17(20) - pregnadiene-3,11-dione 6,21-diisobutyrate, 6β,21-dihydroxy-4,17(20)-pregnadiene-3, 11--dione 6,21-diisovalerate, 6β,21-dihydroxy-4,17(20)-pregnadiene - 3,11-dione 6,21 - dicyclohexanecarboxylate, 6β,21-dihydroxy-4,17(20)-pregnadiene-3,11-dione 6,21-dibenzoate, 6β,21 - dihydroxy - 4,17(20)-pregnadiene-3,11-dione 6,21-diphenylacetate, 6β,21-dihydroxy-4,17(20)-pregnadiene-3,11-dione 6,21-di-β-phenylpropionate, 6β,21-dihydroxy-4,17(20)-pregnadiene-3,11-dione 6,21-di-o-, m- and p-toluate, 6β,21 - dihydroxy - 4,17(20) - pregnadiene- 3,11-dione 6,21 - dihemisuccinate, 6β,21 - dihydroxy-4,17(20)-pregnadiene-3,11-dione 6,21-dihemiadipate, 6β,21-dihydroxy-4,17(20)-pregnadiene-3,11-dione 6,21-diacrylate, 6β,21-dihydroxy - 4,17(20)-pregnadiene-3,11 - dione 6,21-dicrotonate, 6β,21-dihydroxy-4,17(20)-pregnadiene-3,11 - dione 6,21 - diundecylenate, 6β,21 - dihydroxy - 4,17(20)-pregnadiene-3,11-dione 6,21-dipropiolate, 6β,21-dihydroxy - 4,17(20)-pregnadiene-3,11 - dione 6,21-dicinnamate, 6β,21 - dihydroxy - 4,17(20)-pregnadiene - 3,11-dione 6,21-dimaleate, 6β,21-dihydroxy-4,17(20)-pregnadiene-3,11-dione 6,21-dicitraconate, and the like.

EXAMPLE 3

6β-hydroxycortisone 6,21-diacetate

To 193 milligrams (0.45 millimole) of 6β,21-dihydroxy-4,17(20)-pregnadiene-3,11-dione 6,21-diacetate in 7.5 milliliters of tertiary butyl alcohol and 0.2 milliliter of pyridine was added 1.13 millimoles of N-methyl-morpholine oxide peroxide and 1.4 milligrams of osmium tetroxide in 0.75 milliliter of tertiary butyl alcohol. After three hours at room temperature (about 25 degrees centigrade) four milliliters of 0.5 percent sodium sulfite was added and the solution was stirred thirty minutes at room temperature. The solution was then concentrated under reduced pressure until copious crystallization occurred. The mixture was stirred for a period of one hour, filtered and the solid washed first with 1:4 tertiary butyl alcohol-water, then with water; the solids were dried, yielding 135 milligrams of 6β-hydroxycortisone 6,21-diacetate melting at 233 to 237 degrees centigrade. Recrystallization from acetone-Skellysolve B hexanes gave 135 milligrams of 6β-hydroxycortisone 6,21-diacetate having a melting point of 242 to 244.5 degrees centigrade, a specific rotation of $[\alpha]_D$ plus 131 degrees in dioxane, an ultraviolet absorption $$\lambda_{max}^{alc.}\ 231\ m\mu$$

$a_M$ 13,325, and infrared maxima in mineral oil mull of 3540, 1735, 1712, 1697, 1675, 1620 and 1240 reciprocal centimeters.

EXAMPLE 4

Oxygenation with phenyliodosoacetate

To a solution of 1.284 grams (3.0 millimoles) of 6β,21-dihydroxy-4,17(20)-pregnadiene-3,11-dione 6,21-diacetate dissolved in sixty milliliters of tertiary butyl alcohol and 1.5 milliliters of pyridine was added, at 25 degrees centigrade, five milliliters of tertiary butyl alcohol containing 11.1 milligrams (0.044 millimole) of osmium tetroxide and 0.2 milliliter (0.11 millimole) of water. To the solution was then added 2.4 grams (7.5 millimoles) of phenyliodosoacetate. When the reaction was complete, twenty milliliters of water was added to the reaction mixture and then distilled at reduced pressure until copious crystallization occurred. The mixture was stirred for a period of one hour, filtered and the solid washed, first with 1:4 tertiary butyl alcohol-water, then with water, the solids were dried, yielding 6β-hydroxycortisone 6,21-diacetate. Recrystallization from acetone-Skellysolve B hexanes gave substantially pure 6β-hydroxycortisone 6,21-diacetate corresponding to that obtained in Example 3, above.

Similarly, by substituting as starting material other 6β,21-dihydroxy-4,17(20)-pregnadiene - 3,11-dione 6,21-diacylates, prepared in Example 2, the procedures of Examples 3 and 4, above, are productive of other 6β-hydroxycortisone 6,21-diacylates, such as for example, 6β-hydroxycortisone 6,21-dipropionate, 6β-hydroxycortisone 6,21-dibutyrate, 6β-hydroxycortisone 6,21-divalerate, 6β-hydroxycortisone 6,21-dihexanoate, 6β-hydroxycortisone 6,21-dilaurate, 6β-hydroxycortisone 6,21-ditrimethylacetate, 6β-hydroxycortisone 6,21-diisobutyrate, 6β-hydroxycortisone 6,21-diisovalerate, 6β-hydroxycortisone 6,21-dicyclohexane-carboxylate, 6β-hydroxycortisone 6,21-dibenzoate, 6β-hydroxycortisone 6,21-diphenylacetate, 6β-hydroxycortisone 6,21-di-β-phenylpropionate, 6β-hydroxycortisone 6,21-di-o-, m- and p-toluate, 6β-hydroxycortisone 6,21-dihemiadipate, 6β-hydroxycortisone 6,21-diacrylate, 6β-hydroxycortisone 6,21-dicrotonate, 6β-hydroxycortisone 6,21-diundecylenate, 6β-hydroxycortisone 6,21-dipropiolate, 6β-hydroxycortisone 6,21-dicinnamate, 6β-hydroxycortisone 6,21 - dimaleate, 6β - hydroxycortisone 6,21-dicitraconate, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process comprising aerobically contacting 11β,21-dihydroxy-4,17(20)-pregnadien-3-one with the oxidizing activity of a species of fungus of the genus Rhizopus in an aqueous nutrient medium under submerged fermentation conditions and continuing the fermentation until a substantial amount of 6β,21-dihydroxy-4,17(20)-pregnadiene-3,11-dione is formed, and recovering the latter compound from the fermentation medium.

2. A process comprising aerobically contacting 11β,21-dihydroxy-4,17(20)-pregnadien-3-one with the oxidizing activity of organisms of the fungus *Rhizopus arrhizus* in an aqueous nutrient medium under submerged aerobic fermentation conditions and continuing the fermentation until a substantial amount of 6β,21-dihydroxy-4,17(20)-pregnadiene-3,11-dione is formed, and recovering the latter compound from the fermentation medium.

3. A steroid compound of the formula:

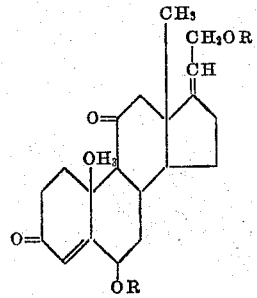

wherein R is the same member selected from the group consisting of hydrogen and the acyl radical of a hydrocarbon carboxylic acid containing from one to twelve carbon atoms, inclusive.

4. 6β,21-dihydroxy-4,17(20)-pregnadiene-3,11-dione.

5. 6β,21-dihydroxy-4,17(20)-pregnadiene-3,11-dione-6,21-diacetate.

References Cited in the file of this patent

UNITED STATES PATENTS

| | | |
|---|---|---|
| 2,602,769 | Murray et al. | July 8, 1952 |
| 2,735,800 | Murray et al. | Feb. 21, 1956 |
| 2,769,823 | Schneider et al. | Nov. 6, 1956 |
| 2,842,568 | Herz et al. | July 8, 1958 |
| 2,875,217 | Schneider | Feb. 24, 1959 |
| 2,899,448 | Beal et al. | Aug. 11, 1959 |

OTHER REFERENCES

"*Ibid*" pages 1331–50 Green CA Vol. 50 page 389i (1956).

UNITED STATES PATENT OFFICE
Certificate of Correction

Patent No. 2,935,521                          May 3, 1960

Arthur R. Hanze et al.

It is hereby certified that error appears in the printed specification of the above numbered patent requiring correction and that the said Letters Patent should read as corrected below.

Column 6, lines 39 to 50, the formula should appear as shown below instead of as in the patent:

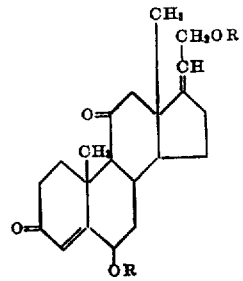

Signed and sealed this 22nd day of November 1960.

[SEAL]

Attest:
KARL H. AXLINE,
*Attesting Officer.*

ROBERT C. WATSON,
*Commissioner of Patents.*